(12) United States Patent
Socaciu et al.

(10) Patent No.: US 10,440,675 B2
(45) Date of Patent: Oct. 8, 2019

(54) METHOD AND APPARATUS TO DETERMINE A WIRELESS NETWORK COVERAGE AND RESPONSIVENESS

(71) Applicant: Empirix Inc., Billerica, MA (US)

(72) Inventors: Michael V. Socaciu, Westford, MA (US); Tibor Ivanyi, Pelham, NH (US); Laslo Turner, Manchester, NH (US)

(73) Assignee: EMPIRIX INC., Billerica, MA (US)

( * ) Notice: Subject to any disclaimer, the term of this patent is extended or adjusted under 35 U.S.C. 154(b) by 232 days.

(21) Appl. No.: 14/178,826

(22) Filed: Feb. 12, 2014

(65) Prior Publication Data

US 2015/0230109 A1 Aug. 13, 2015

(51) Int. Cl.
*H04W 64/00* (2009.01)
*H04W 24/06* (2009.01)
*H04W 24/10* (2009.01)

(52) U.S. Cl.
CPC .......... *H04W 64/00* (2013.01); *H04W 24/06* (2013.01); *H04W 24/10* (2013.01)

(58) Field of Classification Search
CPC ....... H04W 36/30; H04W 4/02; H04W 48/16; H04W 84/12; H04W 88/06; H04W 84/18; H04W 12/06; H04W 36/04; H04W 48/18; H04W 4/06; H04W 4/24; H04W 4/26; H04W 64/00; H04W 80/04; H04W 12/04; H04W 16/32; H04W 24/08; H04W 36/0022; H04L 41/0816; H04L 41/12
USPC ......................................... 455/423; 379/1.01
See application file for complete search history.

(56) References Cited

U.S. PATENT DOCUMENTS

| | | | | |
|---|---|---|---|---|
| 5,023,900 A * | 6/1991 | Tayloe | ................. | H04W 24/00 379/32.01 |
| 2002/0082032 A1* | 6/2002 | Hunzinger | .......... | H04W 76/028 455/510 |
| 2003/0054811 A1* | 3/2003 | Han | ...................... | H04W 24/00 455/423 |
| 2007/0072595 A1* | 3/2007 | Pi | ...................... | H04M 1/72522 455/415 |
| 2011/0044177 A1* | 2/2011 | Nair | ....................... | H04L 41/12 370/241 |
| 2011/0130135 A1* | 6/2011 | Trigui | ................... | H04W 24/08 455/423 |
| 2011/0254961 A1 | 10/2011 | Putnam et al. | | |
| 2012/0071157 A1* | 3/2012 | Markoulidakis | ...... | H04W 24/08 455/423 |

(Continued)

FOREIGN PATENT DOCUMENTS

GB 2416280 A * 1/2006 ............ H04W 16/18

*Primary Examiner* — Natasha W Cosme
(74) *Attorney, Agent, or Firm* — Venable LLP; Jeffri A. Kaminski

(57) ABSTRACT

Aspects of the invention may involve systems and methods. In an embodiment, a method to determine wireless network coverage and responsiveness may be described. The method may include wirelessly transmitting test data to determine wireless connectivity and transmission quality; determining a quality of the wireless transmission of the test data; determining a location of the wireless device during the wireless transmission of the test data; updating a log with the location of the wireless device, a time of day of the wireless transmission, and the quality of the wireless transmission; and transmitting the log to a central server.

26 Claims, 7 Drawing Sheets

(56) References Cited

U.S. PATENT DOCUMENTS

2012/0258733 A1* 10/2012 Fischer ................ H04W 4/20
   455/456.1
2013/0279354 A1* 10/2013 Ekman ................ H04W 24/00
   370/252

* cited by examiner

METHOD AND APPARATUS TO DETERMINE A WIRELESS NETWORK COVERAGE AND RESPONSIVENESS

FIELD OF INVENTION

The present invention relates to wireless network analysis and testing and more specifically to determining coverage and responsiveness of wireless networks.

SUMMARY

Aspects of the invention may involve systems and methods. In one embodiment of the invention, a system may exist for to determining coverage and/or responsiveness of a wireless network. The system may include, for example, one or more computers to send and receive test data and a wireless device, the wireless device may be capable of sending and receiving the test data, the wireless device may include a software application. The software application may include one or more instructions for: transmitting and receiving the test data using a wireless connection, determining connectivity of the wireless connection, determining a quality of the wireless connection based on the wirelessly transmitted and received test data, determining a time of day of transmission when the wireless device transmitted the test data, determining a location where the wireless device transmitted the test data, updating a log with the location of the wireless device, the time of day of transmission, the connectivity of the wireless connection, and the quality of the wireless connection, and transmitting the log to the one or more computers.

In another embodiment of the invention, a method may exist to determine wireless network coverage and responsiveness. The method may include, for example, transmitting wirelessly, by a wireless device, test data to determine wireless connectivity and transmission quality; determining, by the wireless device, a quality of the wireless transmission of the test data; determining, by the wireless device, a location of the wireless device during the wireless transmission of the test data; updating, by the wireless device, a log with the location of the wireless device, a time of day of the wireless transmission, and the quality of the wireless transmission; and transmitting, by the wireless device, the log to a central server.

In yet another embodiment of the invention, a method may exist to determine wireless network coverage and responsiveness. The method may include, for example, receiving, by one or more processors, test data transmitted wirelessly from one or more wireless devices; determining, by the one or more processors, one or more quality measurements of the wireless transmissions of the test data transmitted from the one or more wireless devices; transmitting, by the one or more processors, the one or more quality measurements of the one or more wireless transmission to the one or more wireless devices; receiving, by the one or more processors, log data from the one or more wireless devices, the log data including one or more locations of the one or more wireless devices during one or more transmissions of data by the one or more wireless devices, one or more times of day of the one or more wireless transmissions, and the one or more quality measurements of the one or more wireless transmissions; and calculating, by the one or more processors, wireless network coverage based on the log data received from the one or more wireless devices.

BRIEF DESCRIPTION OF THE DRAWINGS

The foregoing and other features and advantages of the invention will be apparent from the following, more particular description of various embodiments, as illustrated in the accompanying drawings wherein like reference numbers generally indicate identical, functionally similar, and/or structurally similar elements. The first digits in the reference number indicate the drawing in which an element first appears.

DESCRIPTION OF THE EMBODIMENTS

Figure 1:
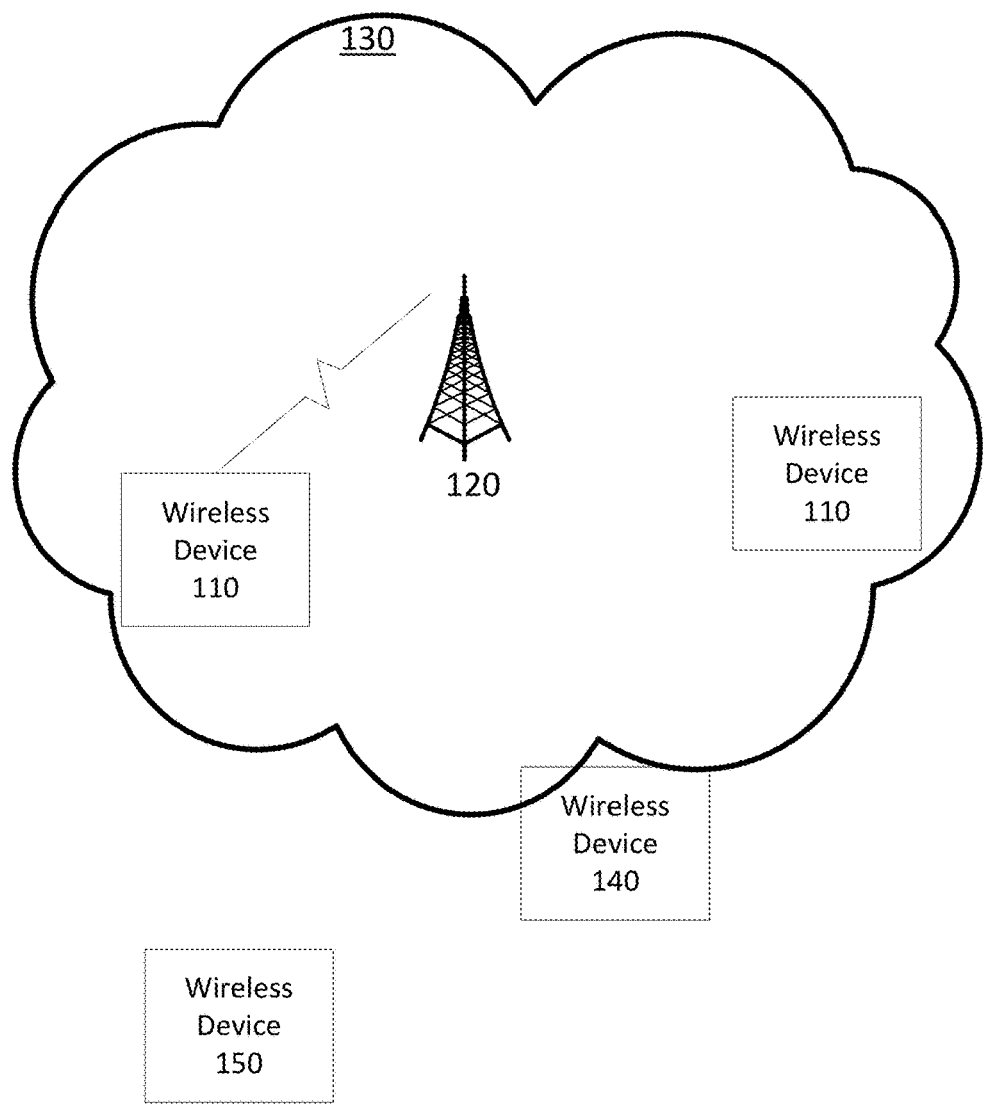
FIG. 1 depicts an example a wireless telecommunication network.

Illustrative embodiments are discussed in detail below. While specific embodiments are discussed, it should be understood that this is done for illustration purposes only. In describing and illustrating the embodiments, specific terminology is employed for the sake of clarity. However, the embodiments are not intended to be limited to the specific terminology so selected. A person skilled in the relevant art will recognize that other components and configurations may be used without departing from the spirit and scope of the embodiments. It is to be understood that each specific element includes all technical equivalents that operate in a similar manner to accomplish a similar purpose. The examples and embodiments described herein are non-limiting examples.

All publications cited herein are hereby incorporated by reference in their entirety. U.S. patent application Ser. No. 13/016,650, filed on Jan. 28, 2011, entitled "Voice Quality Probe for Communication Networks," is hereby incorporated by reference in its entirety.

As used herein, the term "a" refers to one or more. The terms "including," "for example," "such as," "e.g.," "may be" and the like, are meant to include, but not be limited to, the listed examples. The term "product" may refer to both products and services.

An embodiment of the invention may provide or utilize the following components:

Wireless device may be a term used to describe a mobile device used to make a telephone call or access data using a wireless telecommunications network. A wireless device may be, for example, a mobile phone, a smartphone (e.g., Android phone, iPhone, Microsoft Windows phones, Blackberry, etc.), a tablet (e.g., iPad, Surface, Android device, etc.), a computer, a laptop, a camera, a videogame console, or other device that may connect to a wireless telecommunications network.

Global System for Mobile communications (GSM) is an international standard for the interaction of wireless device on a telecommunications network including radio base stations.

Code Division Multiple Access (CDMA2000) is a 3G technology, that may be an alternative to GSM and UMTS, for example.

Universal Mobile Telecommunications System (UMTS) is a 3G technology that may be an alternative to CDMA2000, for example.

Long Term Evolution (LTE) is a 4G technology.

WiFi or wireless LAN (WLAN) provides a wireless network for communication of wireless devices that may use, for example, IEEE 802.11 standards.

Public Switched Telephone Network (PSTN) the original telephone switching network based on wire line technology (a VOIP network, for example, may interconnect with a traditional PSTN network).

Voice over IP (VOIP) is a set of technologies used to implement voice or video calls over a packet switched IP (internet) network as opposed to a dedicated PSTN.

A spike may be a threshold over which a certain number of users are affected by a particular problem.

In telecommunications networks, whether fixed (e.g., land line voice and/or data) or mobile (e.g., voice, SMS, and/or data), situations may arise where users may not be able to connect to the network or may not have a high quality connection between a network device and the service provided on the network maintained by a telecommunications service operator. The impaired activities may include, for example, the ability to initiate or connect a telephone call (e.g., congestion on the network); ability to complete a call that has already started, (e.g., the call drops due to a radio network issue); ability to initiate a connection with the 2G, 3G, 4G, etc. mobile network; ability to complete a data session that has already started (e.g., the connection to the internet service drops); ability to complete the sending of a text message; ability for a mobile device to register on a roaming network; ability for a mobile device to connect to a mobile network upon switching on of the device, ability for a mobile device to continue to stay in communication with the mobile network as the mobile device moves from one mobile base station (e.g., cell tower) to another. Generally, the classes of activity which may be impaired include making calls, texting, maintaining phone in contact with mobile network, ability to access applications (e.g., web browsing) once a data session is established, and the ability to establish and maintain the session once started.

A current problem with wireless networks is determining the actual coverage area of the wireless telecommunication network (e.g., where the aforementioned activities are not impaired). Estimations can be made based on radio tower or base station location and signal strength. However, these estimates are often unable to accurately capture the many variables that may impact coverage area such as, buildings, vegetation (e.g., forests), land formations (e.g., hills, mountains, valleys, etc.), etc. Current instrumentation to accurately test wireless network coverage area may be complicated, expensive, time consuming, and technology specific. What is needed is a system and method that are ubiquitous and easy to use. Such a system and method may test and monitor the responsiveness, reliability, coverage, and range of one or more wireless telecommunication networks using, for example, consumer mobile devices (e.g., mobile phones, smartphones, tablets, etc.).

To remedy the above problem, an embodiment may use, for example, smart phones or mobile devices on which support applications may be deployed and run. Such an application may determine the actual coverage area of a wireless network. For example, the application may determine highway and road coverage of cellular subscribers, along with end to end connection characteristics such as delays and quality of connection. Another embodiment may determine in a floor of a building, one or more buildings, groups of buildings (e.g., campus), or metropolitan area, for example, the coverage and quality connection of WiFi networks. Based on the calculated coverage and quality of connections, coverage and quality maps may be created. Based on the coverage and quality maps, a decision to enhance coverage in identified areas may be made (e.g., dead zones and/or overloaded locations) and/or users in the degraded areas may be alerted to coverage and/or responsiveness issues. Furthermore, managers and technical staff who run the network and manage customer care/relationship may use the determination of coverage and quality of the connection of the wireless network to proactively target remedial activities on the wireless network to, for example, ensure reliable wireless coverage and restore customer satisfaction.

FIG. 1, depicts an example wireless telecommunication network. Base station 120 (e.g., radio tower) may transmit and receive data (e.g., data and/or voice communications) within range 130. Base station 120 may be connected wirelessly or wired with a telecommunications network. Wireless devices 110 within range 130 may transmit and send data to base station 120. Out of range wireless device 150 may not be able to communicate with base station 120 as wireless device 150 is outside range 130 and may not be able to send and receive electromagnetic radiation to and from base station 120. Boundary wireless device 140, may be located at the maximum limit of range 130 to communicate with base station 120. Boundary wireless device 140, may, for example, be traveling in and out of range 130. Accordingly, boundary wireless device 140, for example, may have impaired or degraded voice and data communication, due to its location from base station 120. By detecting when and where wireless device 140 establishes a connection with base station 120 and the telecommunications network, the boundaries of range 130 may be accurately detected.

Figure 2:
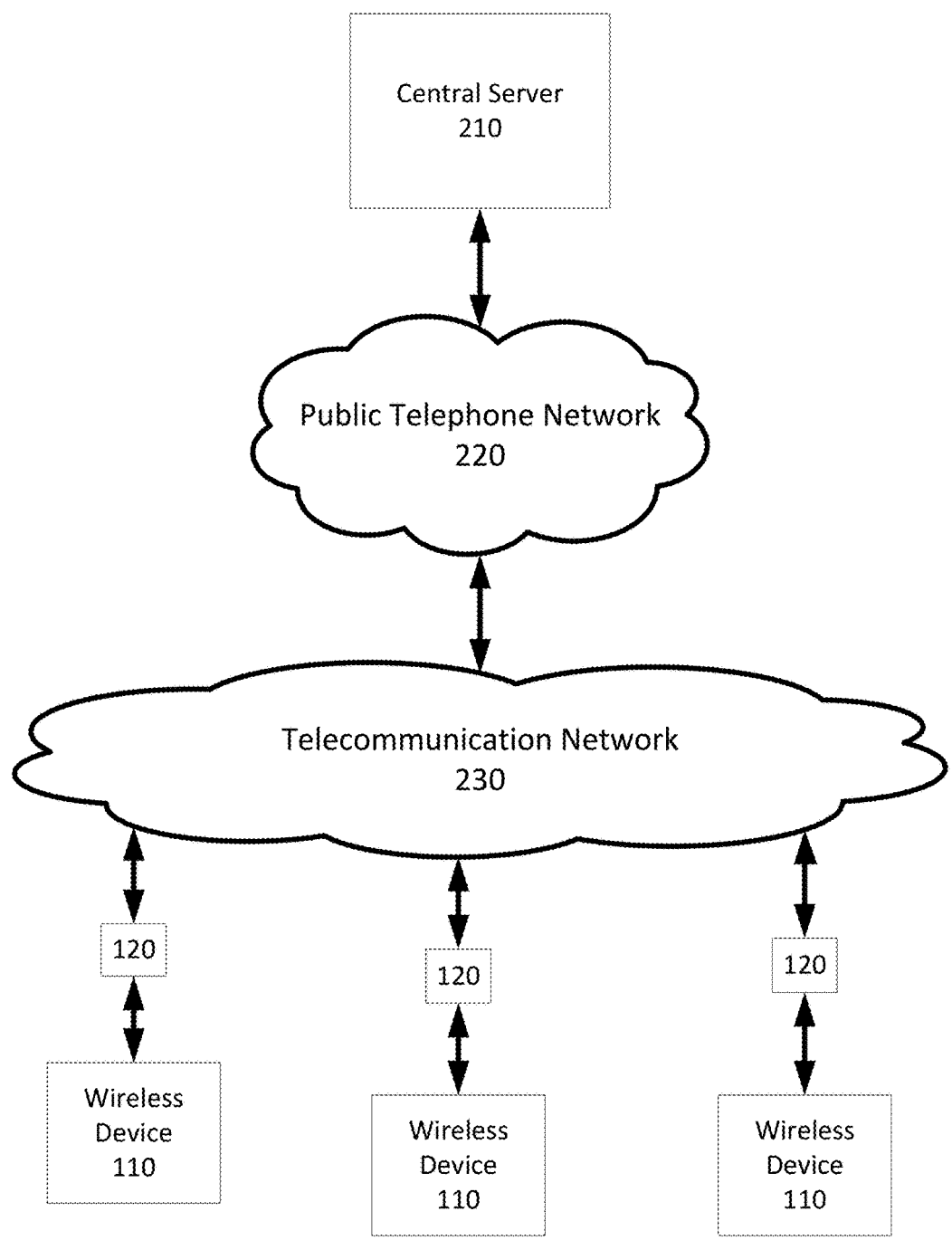
FIG. 2 depicts an example communications network.

FIG. 2, depicts an example communications network. Wireless devices 110 (e.g., mobile devices) may connect and communicate with base stations 120. Base stations 120 may be connected and communicate with telecommunications network 230. Telecommunications network 230 may be connected and communicate with public telephone network 220 (e.g., PSTN). Public telephone network 220 may be connected and communicate with central server 210. In some embodiments, base stations 120 may communicate directly with public telephone network 220 and/or central server 210 may communicate directly with telecommunications network 230. wireless devices 110 may perform connectivity and/or quality tests of the base station 120, telecommunications network 230, public telephone network 220, and/or central server 210. If, for example, a call cannot be made (e.g., because of lack of coverage), wireless devices 110 may store one or more test results and may communicate these test results to central server 210 when connectivity and/or access to central server 210 becomes available.

One embodiment may include one or more mobile devices capable to place wireless calls (e.g., wireless devices 110) and call monitoring equipment (e.g., central server 210) that may be connected to, for example, public telephone network 220. A telephone call from wireless device 110 may be established with central server 210, for example, if the wireless network (e.g., range 130) covers the location from where wireless device 110 originates the call. Once a call from wireless device 110 is established with central server 210, testing setups may be used with wireless device 110 and the monitoring equipment (e.g., central server 210 and/or wireless device 110) to determine duration of the establishment of the call and/or quality of the call. The test may also be run only on the wireless device 110, for example if a call or data connection is not established with central server 210. However, once a connection between wireless device 110 and central server 210 is established, network delays, for example, may be determined. These determinations may, for example, be end to end, based on information available at the end points of the connection (e.g., wireless device 110 and central server 210) and may be tested and determined regardless of the technologies of the components (e.g., mobile phone model (e.g., iPhone, Android, etc.), communication protocol (e.g., 4G, LTE, 3G, CDMA, UMTS, etc.), etc.) involved in establishing the connection. Because the test may be an end to end test, any deployed technology in any wireless generation may be tested using the techniques described herein. In addition to telephone calls, a test may include testing data connections (e.g., non-voice) such as accessing or pinging (e.g., sending a data packet to an intended destination, verifying that a data packet can reach the intended destination, and/or receiving acknowledgement that the data packet was received by the intended destination) a server (e.g., a webserver) and measuring the connectivity, speed, and/or quality of data transmission. SMS may also be monitored.

Central server 210 may include call monitoring equipment for detailed testing of a received or sent call. Central server 210 may include a central machine for answering calls and aiding in the measuring of call quality. Central server 210 may also push software applications (e.g., apps) and information to wireless devices 110. Central server 210 may provide a webserver and/or a website to test data connectivity, speed, and quality. Central server 210 may be the terminating end for testing transactions (e.g., voice and/or data). Additionally, central server 210 may be a repository of test data. In one embodiment, central server 210 may control (e.g., restrict) access to test data allowing only authorized users or devices to retrieve the test data. Alternatively or in conjunction, central server 210 may provide or push test data to authorized users or devices.

Wireless device 110 may be capable of determining its GPS position at any point in time. Alternatively or in addition, wireless device 110 may determine its location based on multilateration of two or more base stations or based on the closest connected wireless access point Accordingly, tests (e.g., establishing a call) may be correlated with the location of wireless device 110 and the timing of the tests. Multiple tests, for example, may be executed from a single location or multiple location to provide statistics. For example, when wireless device 110 travels on a certain road and/or highway a profile of the wireless network connectivity and/or coverage may be raised.

During each test, wireless device 110 may collect data on the current test. Such data may include date and time of day, connection success, wireless device 110 location at time of test, quality of transmission, length of test, telephone numbers of requesting and receiving devices, communication paths used (e.g., base station, signal towers), network element, GGSN, SGSN, handset, APN, cell technology, radio technology (e.g., 2/3/4 G), roaming type, country, carrier, source number, destination number, destination category, destination nature of address, destination numbering plan, OPC/DPC, release location, routing natr, routing numbering plan, source category, source natr, source numbering plan, teleservice information, transmission media requirement, trunk, application, user identifier, handset identifier, and/or error codes. The error codes may indicate what caused problems during the connection and where the problems originated (e.g., wireless device 110, central server 210, telecommunication network 230, PSTN 220, base station 120, etc.). The quality of transmission may include an indicator of voice quality, throughput of data, success ratios, number of bytes downloaded and time for download, lost packets, network delays, etc. The data may be stored in a log (e.g., file) on the wireless device 110. The log may be encrypted. The log may be transmitted to central server 210, periodically at a time of day, upon request from central server 210, as initiated by wireless device 110, and/or as designated by wireless device 110. In some embodiments, the log may also include the connection data (e.g., telephone number, IP address, etc.). Central server 210 may maintain a history of the transmitted logs. Central server 210 may store data on one or more wireless devices 110.

The quality of the call may be determined, for example, by a voice quality scoring technique such using an audio quality analyzer to calculate mean option score (MOS) values. The determined quality may be stored and saved on the wireless device 110 and/or central server 210.

Tests may be triggered, for example, based on time of day and/or location of wireless device 110. A location trigger may be based on the location of the wireless device 110 and/or a distance traveled by the wireless device 110. For example, if a test fails to connect, another test may be initiated when wireless device 110 has traveled a certain distance (e.g., 1,000 feet) from the location where the test failed or a certain period of time has passed. Additionally, the tests may be initialized by wireless device 110 or may be requested by central server 210 or other external source.

Personalized profiles specific to wireless device 110 may be kept in the device for use by private users. Additionally, profiles determined for specific wireless network service providers may be generated and made available to the providers or other travelling organizations. A profile may provide a testing schedule for the wireless device 110 or devices unique to a provider. For example, provider X may schedule wireless devices 110 associated with provider X to test every 15 minutes while provider Y may schedule wireless devices 110 associated with provider Y to test every 5 minutes. Information in the profile, including test scheduling information, may be communicated (e.g., pushed or pulled) to wireless devices 110 from the central server.

Software applications on wireless device 110 may use the personalized profiles and/or the logged data to provide a user of wireless device 110 with an indication of an estimated connection status and/or quality based on the current location of wireless device 110 and/or time of day. The indication may be, for example, green for clear connection, red for no connection, and/or yellow for reduced connectivity. Alternatively, a numeric scale (e.g., 1-10) may be used to indicate quality and connection status. In one example, based on the log data and/or personal profile, the application may anticipate that for the current location of wireless device 110 at the current time of day, the connection quality may be reduced and wireless device 110 may display an indication (e.g., yellow) that the quality may be reduced. Network quality may be reduced, for example, because of network congestion at certain times of day. In another example, based on the log data and/or personal profile, the application may anticipate wireless device 110 may soon drop a connection based on the current trajectory of wireless device 110 and the lack of service (based on log data) in an upcoming area. Such an indication may inform the user to postpone a call until mobile device 110 is in a location with a strong connection and high quality. Accordingly, wireless device 110 may inform a user of when to place a phone call. Additionally, should a carrier learn that an area is experiencing congestion, the carrier could push this information to wireless device 110 and provide a user with a status indication that a problem exists (e.g., too much congestion). Based on time of day and known congestion patterns, wireless device 110 may indicate congestion to the user and inform the user as to when congestion may be reduced (e.g., wait 5 minutes to place a call).

Multiple Probes

Multiple wireless devices 110 may be used to determine the network connectivity and/or coverage at various locations and times. For example, when multiple mobile device probes (e.g., wireless devices 110) are activated, the monitoring equipment may record the positions of each of the mobile device probes. Thus, the geographical distribution of the mobile device probes may be known at any point in time. The monitoring equipment may be thus enabled to explore a certain geographic area by requesting probes (e.g., wireless devices 110) in that specific area to trigger tests. The providers, for example, may push software applications (e.g., temporary apps) to wireless devices 110 and activate the pushed applications to test the geographical area coverage and/or test the geographical area at a particular time of day (e.g., rush hour, busy hour) or during an particular event (e.g., natural disaster, terrorist attack, etc.).

Multiple wireless devices 110 may call a common number that may be located with central server 210 or the number called may be based on the location of the particular wireless device 110.

By periodically executing tests, geographic areas may be monitored and dynamic statistics gathered. Correlating statistics parameters may detect anomalies such as, for example, traffic congestion.

Buildings and Metropolitan Areas

Mobile devices with WiFi capabilities may be engaged to connect to central server 210, for example, to determine the coverage inside a building or a metropolitan area. Connections may be setup, for example, using SIP, RTP, HTTP, and/or SS7. Establishing connections may be used to determine the coverage of the WiFi network under test.

Figure 3:
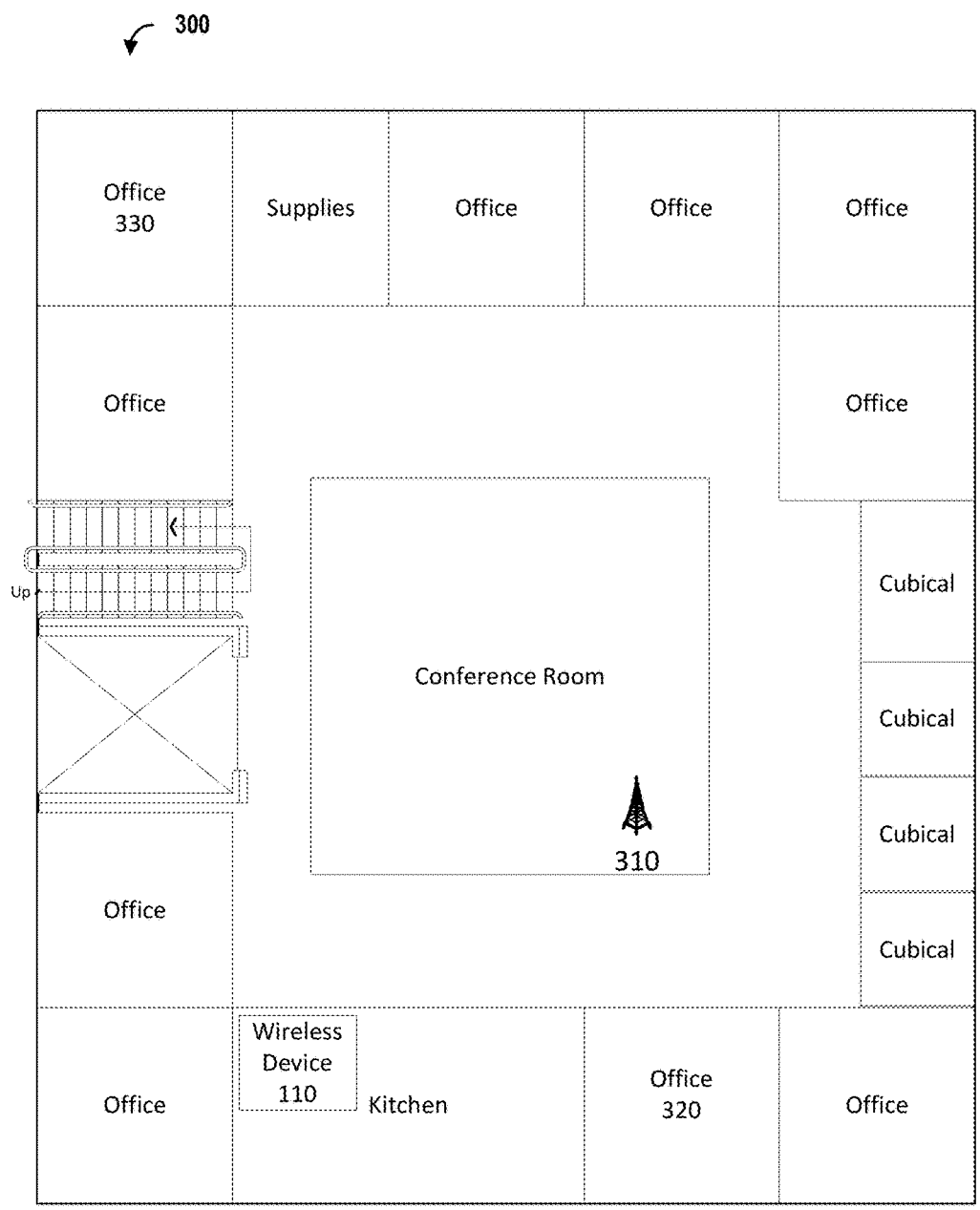
FIG. 3 depicts a sample floor in an office building.

FIG. 3, depicts a sample floor 300 in a typical office building. Sample floor 300 may include offices, cubicles, supply rooms, elevators, and other spaces typical of a floor in an office building. WiFi router 310 (e.g., wireless access point) may be deployed within sample floor 300. Wireless device 110 may connect to router 310. A wireless device in office 320 may have a strong connection, while another wireless device in office 330, for example, may not due to the distance from WiFi router 310 and/or interference. Wireless devices 110 may perform tests to determine the physical perimeter and range of WiFi router 310 and the coverage quality. Wireless devices 110 may transmit and receive to and from central server 210 to determine connectivity and data transmission quality. Such tests may determine the range of the WiFi router 310 on the floor 300 as well as the number of other floors where connectivity may be achieved by wireless devices 110 on the other floors. By determining the range of WiFi router 310, a coverage map may be made of the floor and/or building. A similar technique may be used for larger areas including multiple buildings, WANs, or MANs.

EXAMPLE EMBODIMENTS

Figure 4:
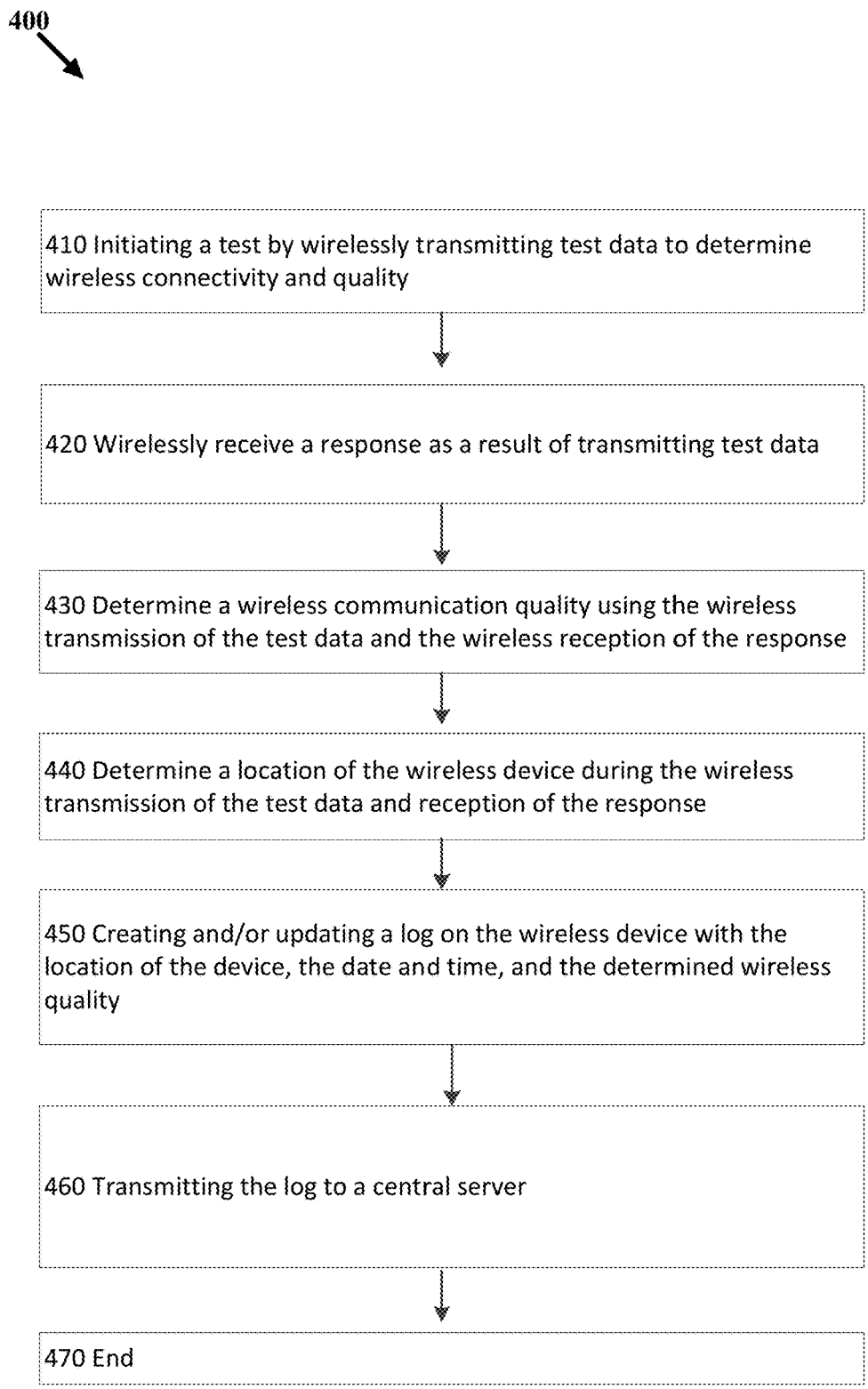
FIG. 4 depicts an example flowchart describing processing performed in an illustrative embodiment.

FIG. 4 depicts an example flowchart 400 describing processing performed in an illustrative embodiment.

In 410, a test may be initiated on wireless device 110. Test data may be wirelessly transmitted from wireless device 110 to central server 210. The test data may include voice and/or binary data. Test data may include packets formatted in, for example, HTTP, RTP, SIP, SS7, or other formats and may include SMS messages. Test data may be transmitted to determine wireless connectivity and quality of transmission. The test may be, for example, initiated periodically, at scheduled intervals (e.g., 1:00 am every day, every 5 hours, etc.), at a designated event (e.g., on connection, when wireless device 110 enters a specified location, etc.), when location has changed (e.g., the mobile device detects a specified distance has passed since the last test (e.g., driving on a highway)), at a request by central server 210, and/or by user request at wireless device 110. The test may include placing a telephone call to a specified telephone number (e.g., a number associated with central server 210) or sending data to a specific IP address or domain name. From 410, flow may move to 420.

In 420, wireless device 110 may receive a response from central server 210 as a result of transmitting the test data. From 420, flow may move to 430.

In 430, the wireless communication quality may be determined based on whether a connection is established; the transmission of test data from wireless device 110 to central server 210; or receipt of test data from central server 210 by wireless device 110. Quality may be determined by wireless device 110, central server 210, or both. The quality of transmission may include, for example, voice quality, throughput of data, success ratios, number of bytes downloaded and time for download, lost packets, network delays, etc. A voice quality scoring technique using, for example, an audio quality analyzer to calculate MOS values may be used to determine voice quality. From 430, flow may move to 440.

In 440, a location of wireless device 110 may be derived based on a GPS position at the time of sending and/or receiving the test data. Alternatively or in addition, wireless device 110 may determine its location based on multilateration of two or more base stations or based the closest connected wireless access point. From 440, flow may move to 450.

In 450, a log may be created or updated on wireless device 110. The log may contain test data such as, for example, time of day, connection success, wireless device 110 location at the time of test, quality of transmission, and/or error codes. The error codes may indicate what caused problems during the connection and/or where the problems originated (e.g., wireless device 110, central server 210, telecommunication network 230, PSTN 220, base station 120, etc.). The quality of transmission may include an indicator of voice quality, throughput of data, success ratios, number of bytes downloaded and time for download, lost packets, network delays, etc. From 450 flow may move to 460.

In 460, the log may be transmitted to central server 210. Transmission of the log from wireless device 110 to server 210 may occur periodically, routinely, at a scheduled interval (e.g., 1:00 am every day, every 5 hours, etc.), at a designated event (e.g., on each connection, after test completion, after 5 log entries, when wireless device enters a specified location, etc.), at a request by central server 210, and/or by user request at wireless device 110.

Central server 210 may receive test log data from one or more wireless devices 110. Using the test log data from the one or more wireless devices 110, central server 210 may prepare a wireless coverage map detailing the current coverage of the wireless telecommunication service area. Based on the received test log data, central server 210 may provide one or more wireless devices 110 with a current network status. The current network status may include a current network coverage map including current outages and congestion areas. The wireless coverage map may be displayed on wireless device 110 and/or may be transmitted to other data repositories and dissemination outlets (e.g., website). Wireless device 110 may also display an indication of the current status of the network based on the location of wireless device 110. The indication may provide the current status of the network such as available, not available, congested, degraded, voice only, data only, etc. Additionally, wireless device 110 may display an indication that a call will have degraded quality or the call will drop based on a current trajectory of wireless device 110 and the network status data and/or the log data. From 460, flow may move to 470 and end.

Coverage Maps

Figure 5:
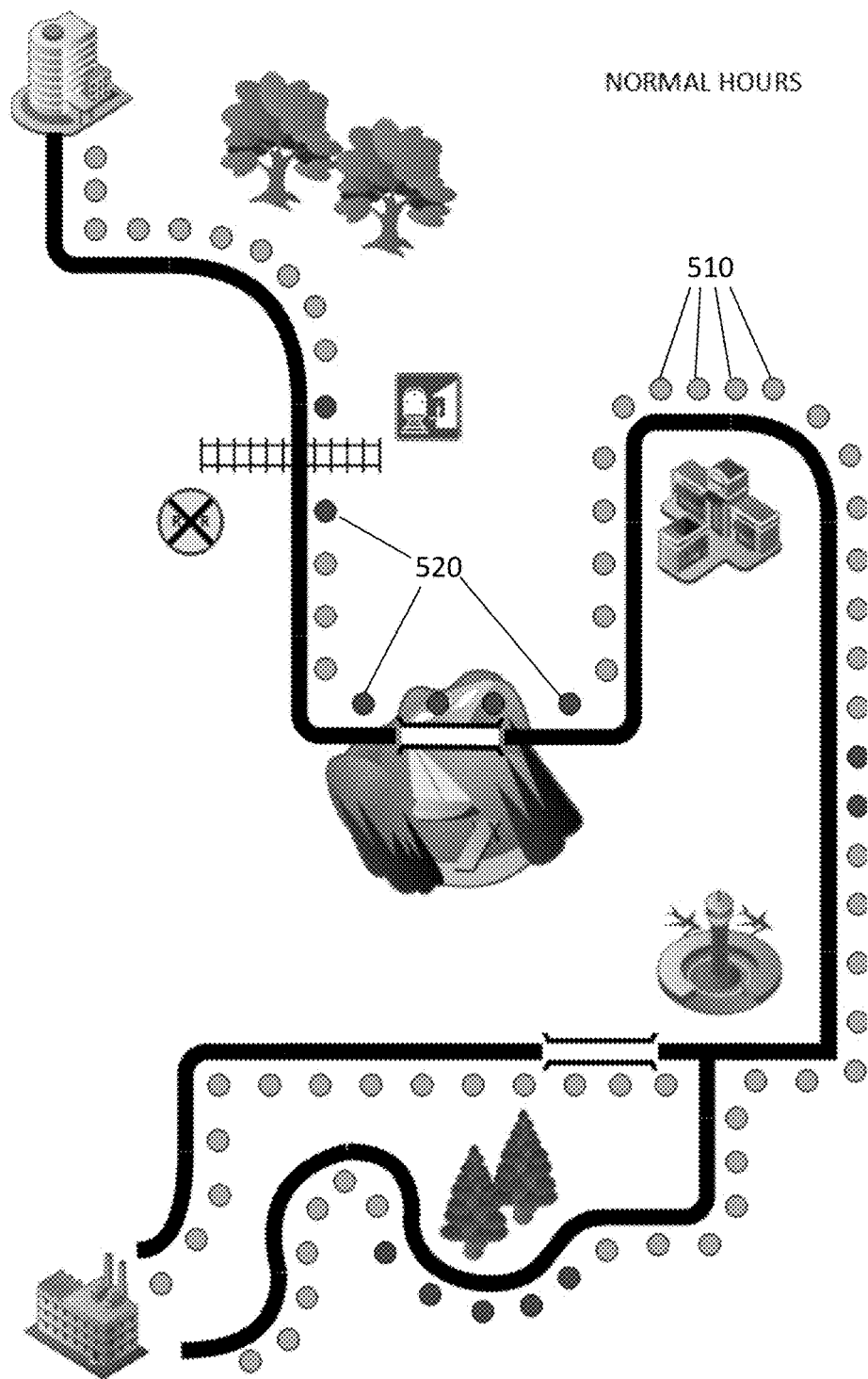
FIG. 5 depicts an example coverage map.

FIG. 5 depicts an example coverage map. A coverage map may include the results of network tests overlaid on an existing physical or general purpose map of one or more regions. The physical or general purpose map may show, for example, show geographical features (e.g., mountains, forests, bodies of water, rivers, etc.) and land use (e.g., railroads, roads, buildings, structures, etc.). The coverage map may be updated in real-time or near real-time as test data from wireless devices 110 is received and the results are displayed on the coverage map. Users may be able to view a live coverage map to determine the current range and/or responsiveness of the wireless coverage.

FIG. 5 depicts example roads, a railroad, forests, a lake, a city, an airport, a factory and multiple test results in areas where one or more wireless devices 110 performed tests.

Figure 6:
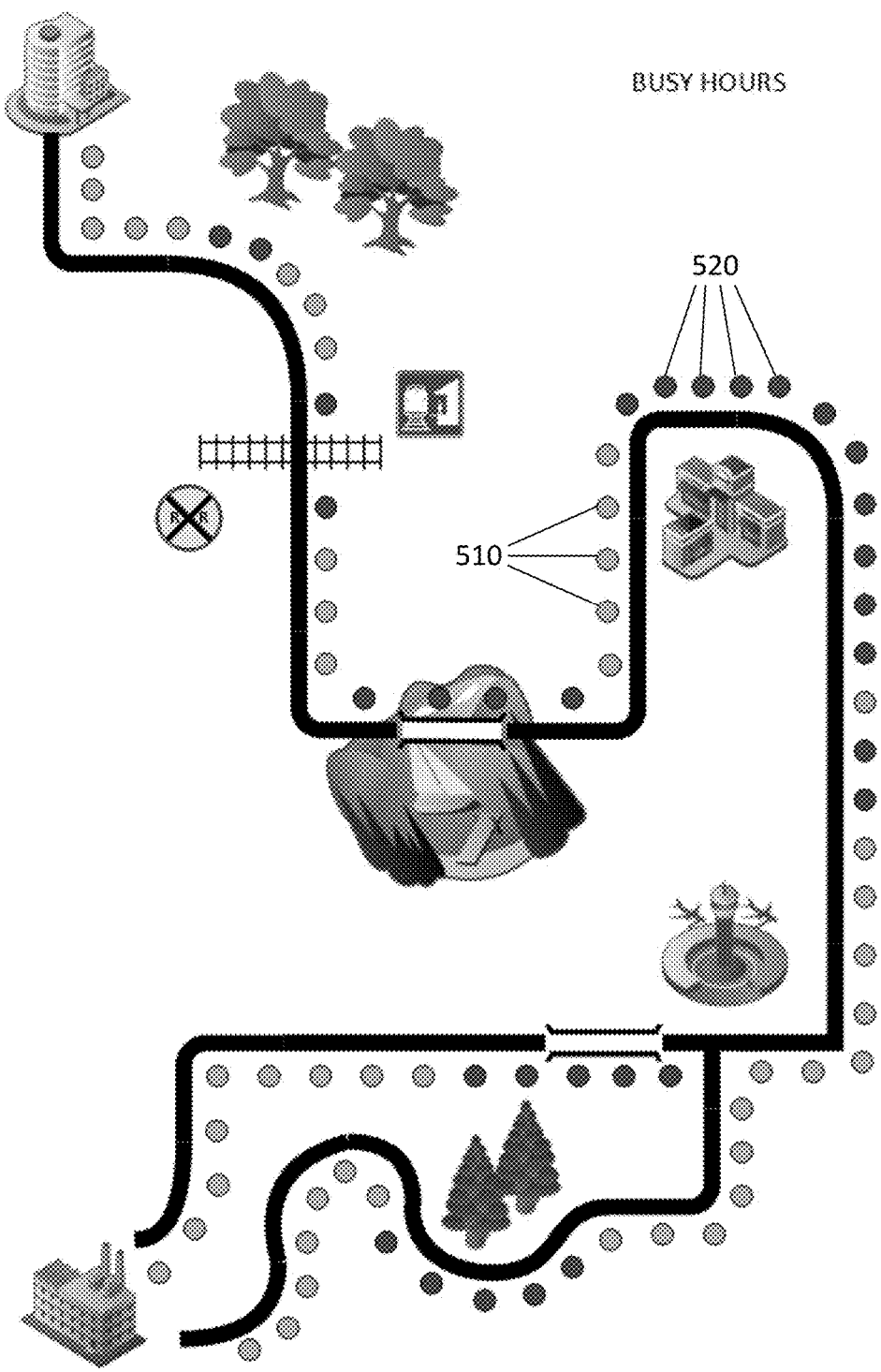
FIG. 6 depicts another example coverage map.

FIG. 6 depicts another example coverage map shown at a different time of day from FIG. 5. FIG. 6, for example, depicts areas where network coverage is no longer responsive. Users and/or authorized devices may be able to view real-time coverage maps as data is received by, compiled, and transmitted from central server 210, for example. Central server 210 may include a webserver, for example, and may transmit data to allow a browser or other software to display coverage maps on wireless devices 110 or other devices.

FIGS. 5 and 6 illustrate successful tests 510, shown, for example, as a green dot or a lighter shaded dot, which may depict areas where voice and/or data was tested and successfully passed the test. Failed tests 520, may be shown, for example, as a red dot or a darker shaded dot, may depict areas were voice and/or data tests failed or are currently failing. Each dot may represent an area where one or more wireless devices 110 performed one or more tests of the network (e.g., voice and/or data tests). Different colors and/or shades and/or shapes may be used to indicate network information and status at various locations. For example, areas that have degraded transmission/reception rates and/or poor quality may be depicted as orange, while areas with high congestion may be depicted as white, while areas that only transmit voice may be depicted as yellow, while other areas where only data is available may be depicted as blue. Other techniques to indicate or display network status may also be employed such as different shapes, lines through the dot, or textual information overlaid on the coverage map. Each dot may represent the most recent test. The size of the dot, for example. may represent the accuracy of the test based on time (how recent) or the number of tests performed recently at that area (e.g., last 30 seconds, 1 minute, 5 minutes, 10 minutes, 15 minutes, etc.). A dot representing a recent test may begin to shrink or fade as time passes, for example.

As the coverage maps may be updated in real-time, FIGS. 5 and 6 may be considered to be snapshots of a particular instance in time for the coverage map. In an embodiment, the coverage maps described herein may include live, real-time updates of network coverage based on wireless device 110 testing data; while other, currently existing coverage maps, may be static and describe only an estimated coverage that is not based on real-time testing data and may be based on the location and/or signal strength of base stations.

Illustrative Computer System

Figure 7:
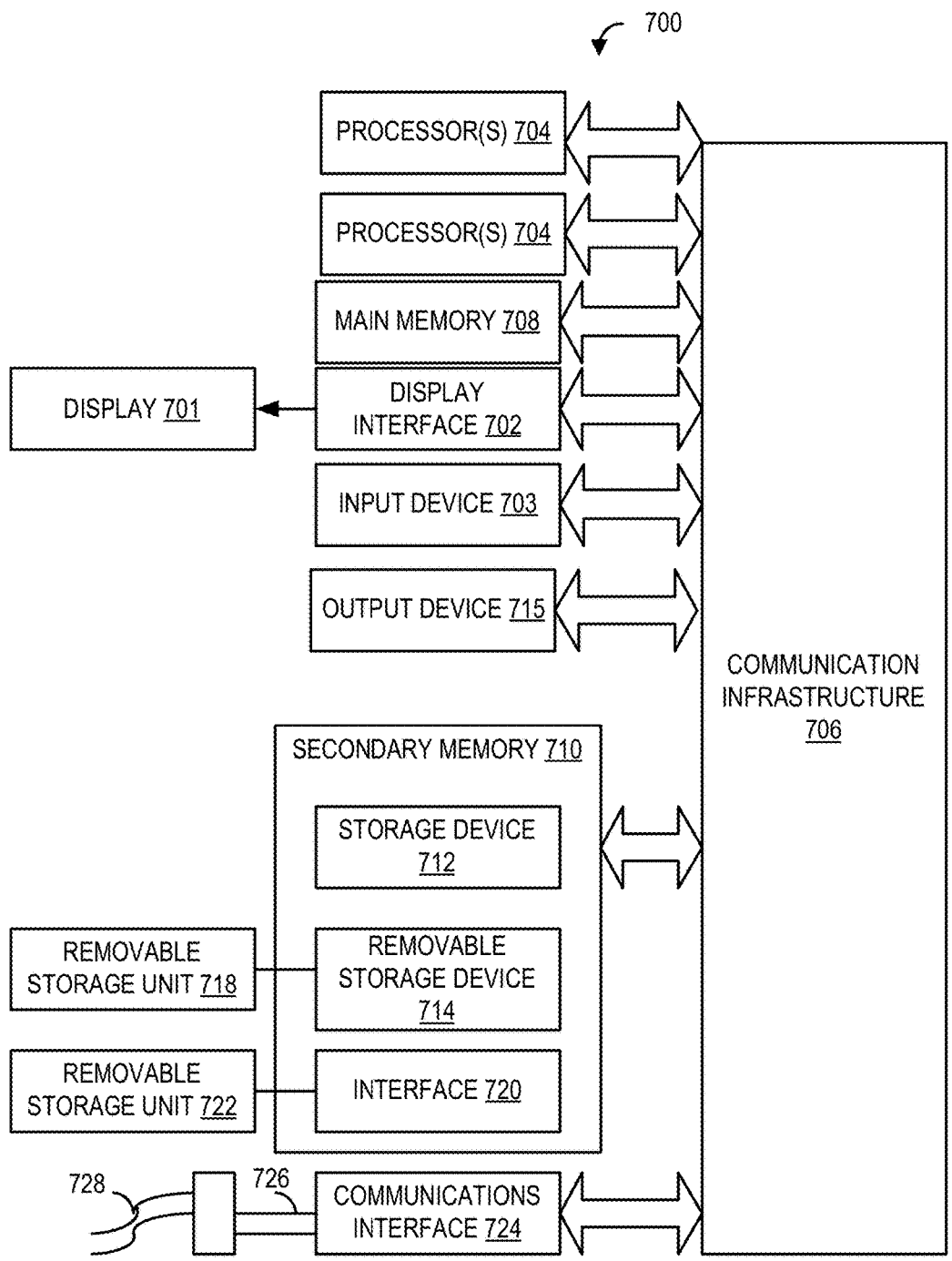
FIG. 7 depicts an example computer system that may be used in implementing an illustrative embodiment of the present invention.

FIG. 7 depicts an illustrative computer system that may be used in implementing an illustrative embodiment of the present invention. Specifically, FIG. 7 depicts an illustrative embodiment of a computer system 700 that may be used in computing devices such as, e.g., but not limited to, stand-alone or client or server devices. FIG. 7 depicts an illustrative embodiment of a computer system that may be used as client device, or a server device, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 700 is shown in FIG. 7, depicting an illustrative embodiment of a block diagram of an illustrative computer system useful for implementing the present invention. Specifically, FIG. 7 illustrates an example computer 700, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/Windows 8, etc. available from MICROSOFT® Corporation of Redmond, Wash., U.S.A. or an Apple computer executing MAC® OS or iOS from Apple® of Cupertine, Calif., U.S.A. However, the invention is not limited to these platforms. Instead, the invention may be implemented on any appropriate computer system running any appropriate operating system. In one illustrative embodiment, the present invention may be implemented on a computer system operating as discussed herein. An illustrative computer system, computer 700 is shown in FIG. 7. Other components of the invention, such as, e.g., (but not limited to) a computing device, a communications device, a telephone, a personal digital assistant (PDA), an iPhone, a 3G/4G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 7. In an illustrative embodiment, services may be provided on demand using, e.g., an interactive television device (iTV), a video on demand system (VOD), via a digital video recorder (DVR), and/or other on demand viewing system. Computer system 700 may be used to implement the network and components as described in FIGS. 1, 2, and 3. Such as wireless device 110 and central server 210.

The computer system 700 may include one or more processors, such as, e.g., but not limited to, processor(s) 704. The processor(s) 704 may be connected to a communication infrastructure 706 (e.g., but not limited to, a communications bus, cross-over bar, interconnect, or network, etc.). Processor 704 may include any type of processor, microprocessor, or processing logic that may interpret and execute instructions (e.g., for example, a field programmable gate array (FPGA)). Processor 704 may comprise a single device (e.g., for example, a single core) and/or a group of devices (e.g., multi-core). The processor 704 may include logic configured to execute computer-executable instructions configured to implement one or more embodiments. The instructions may reside in main memory 708 or secondary memory 710. Processors 704 may also include multiple independent cores, such as a dual-core processor or a multi-core processor. Processors 704 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

Computer system 700 may include a display interface 702 that may forward, e.g., but not limited to, graphics, text, and other data, etc., from the communication infrastructure 706 (or from a frame buffer, etc., not shown) for display on the display unit 701. The display unit 701 may be, for example, a television, a computer monitor, or a mobile phone screen. The output may also be provided as sound through a speaker.

The computer system 700 may also include, e.g., but is not limited to, a main memory 708, random access memory (RAM), and a secondary memory 710, etc. Main memory 708, random access memory (RAM), and a secondary memory 710, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 710 may include, for example, (but is not limited to) a hard disk drive 712 and/or a removable storage drive 714, representing a floppy diskette drive, a magnetic tape drive, an optical disk drive, a compact disk drive CD-ROM, flash memory, etc. The removable storage drive 714 may, e.g., but is not limited to, read from and/or write to a removable storage unit 718 in a well-known manner. Removable storage unit 718, also called a program storage device or a computer program product, may represent, e.g., but is not limited to, a floppy disk, magnetic tape, optical disk, compact disk, etc. which may be read from and written to removable storage drive 714. As will be appreciated, the removable storage unit 718 may include a computer usable storage medium having stored therein computer software and/or data.

In alternative illustrative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 722 and interfaces 720, which may allow software and data to be transferred from the removable storage unit 722 to computer system 700.

Computer 700 may also include an input device 703 which may include any mechanism or combination of mechanisms that may permit information to be input into computer system 700 from, e.g., a user. Input device 703 may include logic configured to receive information for computer system 700 from, e.g. a user. Examples of input device 703 may include, e.g., but not limited to, a mouse, pen-based pointing device, or other pointing device such as a digitizer, a touch sensitive display device, and/or a keyboard or other data entry device (none of which are labeled). Other input devices 703 may include, e.g., but not limited to, a biometric input device, a video source, an audio source, a microphone, a web cam, a video camera, and/or other camera.

Computer 700 may also include output devices 715 which may include any mechanism or combination of mechanisms that may output information from computer system 700. Output device 715 may include logic configured to output information from computer system 700. Embodiments of output device 715 may include, e.g., but not limited to, display 701, and display interface 702, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 700 may include input/output (I/O) devices such as, e.g., (but not limited to) input device 703, communications interface 724, cable 728 and communications path 726, etc. These devices may include, e.g., but are not limited to, a network interface card, and/or modems.

Communications interface 724 may allow software and data to be transferred between computer system 700 and external devices.

In this document, the terms "computer program medium" and "computer readable medium" may be used to generally refer to media such as, e.g., but not limited to, removable storage drive 714, a hard disk installed in hard disk drive 712, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to computer system 700. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product, such as, for example, a scientific modeling product. It may be downloadable from a network, for example, a website, as a stand-alone product or as an add-in package for installation in an existing software application. It may also be available as a client-server software application, or as a web-enabled software application. It may also be part of a system for detecting network coverage and responsiveness. Computer system 700 may be used to create a general purpose computer. A general purpose computer may be specialized by storing programming logic that enables one or more processors to perform the techniques indicated herein and the steps of FIG. 4. Computer system 700 or multiple embodiments of computer system 700 may be used to perform the functions of central server 210.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents. The embodiments of the present invention that have been described above may contain features that may be removed or combined between the described embodiments to derive additional embodiments.

What is claimed is:

1. A method comprising:
transmitting wirelessly, at a first location of a wireless device and by the wireless device, a first wireless transmission of test data to determine wireless connectivity and transmission quality of a call;
determining, by the wireless device, a quality of the first wireless transmission at the first location;
updating, by the wireless device, a log with the first location of the wireless device, a time of day of the first wireless transmission, and the quality of the first wireless transmission at the first location, to yield an updated log;
transmitting, by the wireless device, the updated log to a central server;
receiving, at a second location of the wireless device and by the wireless device, connection failure data of a second transmission of the test data, the connection failure data indicating the transmission quality of the call is below a threshold;
determining, by the wireless device, that the wireless device has traveled a specified, preselected distance from the second location, to yield a distance trigger;
transmitting, upon triggering the distance trigger at a third location which is at least the specified, preselected distance from the second location, and by the wireless device, a third transmission of the test data, to yield third transmission test results; and
transmitting, by the wireless device, the connection failure data and the third transmission test results to the central server when a connection to the central server becomes available.

2. The method of claim 1, wherein transmissions of test data are further based on a passing of a specified interval of time.

3. The method of claim 1, wherein location of the wireless device is determined based on global positioning satellites (GPS), multilateration of two or more base stations, or a connected wireless access point.

4. The method of claim 1, wherein each transmission of test data comprises transmission of SIP, HTTP, or RTP formatted data.

5. The method of claim 1, wherein each transmission of test data comprises:
initiating a telephone call to a specified telephone number; or
initiating a non-voice data transmission to the central server.

6. The method of claim 1, further comprising:
receiving, by the wireless device, network status data, the network status data being determined by data received from a plurality of wireless devices.

7. The method of claim 6, further comprising:
displaying an indicator indicating a status of a network based on the network status data.

8. The method of claim 6, further comprising:
displaying an indication, on the wireless device, that the call will have degraded quality or the call will drop based on a current trajectory of the wireless device and the network status data.

9. The method of claim 6, further comprising:
displaying, on the wireless device, a network coverage map based on the network status data.

10. The method of claim 9, wherein the network coverage map is based on at least one of: wireless network geographic coverage, wireless network coverage based on time of day, or real-time network coverage.

11. The method of claim 1, wherein the wireless device receives and transmits data using at least one of: WiFi, 3G, 4G, LTE, UMTS, WiMAX, or GSM.

12. A method for determining wireless network coverage and responsiveness, the method comprising:
transmitting a software application to a mobile device, wherein the software application causes the mobile device to perform the steps of claim 1.

13. A method comprising:
receiving, by one or more processors, first test data transmitted wirelessly from a wireless device at a first location;
determining, by the one or more processors, one or more quality measurements of the first test data;
transmitting, by the one or more processors, the one or more quality measurements to the wireless device;
receiving, by the one or more processors, log data from the wireless device, the log data comprising data recorded at at least two locations by the wireless device, the at least two locations being separated by a specified, preselected distance;
generating, by the one or more processors, connection failure data from the wireless device, wherein:
the connection failure data includes the at least two locations, and
the at least two locations comprises a second location where a of transmission of second test data failed and a third location where a transmission of third test data was successfully,
the third test data was transmitted upon triggering transmission due to traveling the specified, preselected distance from the second location; and
calculating, by the one or more processors, wireless network coverage based on the log data and the connection failure data.

14. The method of claim 13, further comprising:
calculating wireless network responsiveness based on the log data received from the wireless device.

15. The method of claim 13, further comprising:
pushing a request to transmit test data to the wireless device.

16. The method of claim 13, further comprising:
transmitting network coverage data to the wireless device based on the wireless network coverage.

17. The method of claim 13, further comprising:
transmitting a current network status indicator to one or more wireless devices in a geographic area.

18. The method of claim 17, wherein the current network status indicator is one of: network congestion issue or network congestion issue resolved.

19. The method of claim 17, wherein the current network status indicator is one of: red, yellow, or green.

20. The method of claim 13, wherein the wireless network coverage is calculated based on areas of congestion based on time of day or a geographic range of the wireless network coverage.

21. A system comprising:
a processor; and
a non-transitory computer-readable storage medium having instructions stored which, when executed by the processor, cause the processor to perform operations comprising:
transmitting wirelessly, at a first location of a wireless device and by the wireless device, a first wireless transmission of test data to determine wireless connectivity and transmission quality of a call;
determining, by the wireless device, a quality of the first wireless transmission at the first location;
updating, by the wireless device, a log with the first location of the wireless device, a time of day of the first wireless transmission, and the quality of the first wireless transmission at the first location, to yield an updated log;
transmitting, by the wireless device, the updated log to a central server;
receiving, at a second location of the wireless device and by the wireless device, connection failure data of a second transmission of the test data, the connection failure data indicating the transmission quality of the call is below a threshold;
determining, by the wireless device, that the wireless device has traveled a specified, preselected distance from the second location, to yield a distance trigger;
transmitting, upon triggering the distance trigger at a third location which is at least the specified, preselected distance from the second location, and by the wireless device, a third transmission of the test data, to yield third transmission test results; and
transmitting, by the wireless device, the connection failure data and the third transmission test results to the central server when a connection to the central server becomes available.

22. The system of claim 21, wherein the third transmission further relies upon a time trigger, the time trigger being a predefined amount of time between the second transmission and the third transmission.

23. The system of claim 22, wherein the third transmission is not transmitted until both the time trigger and the distance trigger have been met.

24. The system of claim 21, the non-transitory computer-readable storage medium having additional instructions stored which, when executed by the processor, cause the processor to perform operations comprising:
receiving a current network status.

25. The system of claim 24, the non-transitory computer-readable storage medium having additional instructions stored which, when executed by the processor, cause the processor to perform operations comprising: displaying a state of a network based on the current network status and a current location of the wireless device.

26. The system of claim 24, the non-transitory computer-readable storage medium having additional instructions stored which, when executed by the processor, cause the processor to perform operations comprising: displaying a notification that a call will have degraded quality or the call will drop based on a current trajectory of the wireless device and the current network status.

* * * * *